US008144983B1

(12) United States Patent
Kulkarni (10) Patent No.: US 8,144,983 B1
(45) Date of Patent: Mar. 27, 2012

(54) IMAGE EDITING WORKFLOW WITH COLOR MANAGEMENT

(75) Inventor: Manish S. Kulkarni, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1215 days.

(21) Appl. No.: 11/846,186

(22) Filed: Aug. 28, 2007

(51) Int. Cl.
*G06K 9/00* (2006.01)
(52) U.S. Cl. ........................................... 382/167
(58) Field of Classification Search .................... 382/167
See application file for complete search history.

(56) References Cited

U.S. PATENT DOCUMENTS

| | | | | |
|---|---|---|---|---|
| 6,249,315 | B1* | 6/2001 | Holm | 348/251 |
| 6,628,823 | B1* | 9/2003 | Holm | 382/162 |
| 7,339,700 | B2* | 3/2008 | Ohga et al. | 358/1.9 |
| 2007/0098256 | A1* | 5/2007 | Kulkarni et al. | 382/162 |
| 2008/0252915 | A1* | 10/2008 | Jun | 358/1.9 |

OTHER PUBLICATIONS

International Color Consortium, Specification ICC.1:2004-10 (Profile version 4.2.0.0), "Image technology colour management—Architecture, profile format, and data structure," [Revision of ICC. 1:2003-09], May 22, 2006; © ICC 2004; 112 pgs.

* cited by examiner

*Primary Examiner* — David Zarka
(74) *Attorney, Agent, or Firm* — Fish & Richardson P.C.

(57) ABSTRACT

The present disclosure includes systems and methods relating to preserving color representations during color transformation processes. In general, one aspect of the subject matter described in this specification can be embodied in a method that includes receiving a mathematical model for use in transforming color data from one color space to another color space and generating a substantially invertible approximation of the mathematical model that conforms to a defined color management system architecture.

35 Claims, 4 Drawing Sheets

IMAGE EDITING WORKFLOW WITH COLOR MANAGEMENT

BACKGROUND

The present disclosure relates generally to digital editing of color images and more specifically to preserving color representations during color transformation processes.

Color images captured, generated, or represented by one device can be processed using a different device. This occurs, for example, when color images captured on film are digitized, digitally edited, and then transferred back to film. Because each device has its own color characteristics, a mathematical color transformation is needed to map colors from the source device color space to the destination device color space. To map colors from the destination device color space back to the source device color space, the mathematical transformation is inverted. Each color transformation must account for the color characteristics of both the source device and the destination device, therefore a unique color transformation is required for each source device-destination device pair. For example, editing color images captured on film of type X with a digital editing tool of type Z requires an X-Z color transformation from the film color space to the digital editing tool color space, while editing color images captured on film of type Y with a digital editing tool of type Z requires a Y-Z color transformation from the film color space to the digital editing tool color space. To accommodate all possible device pairings in a system of n devices, $(n^2-n)/2$ unique transformations are required.

Device-independent color transformations map colors between a device color space and a standard color space S. For example, editing color images captured on film of type X with a digital editing tool of type Z can be accomplished using an X-S color transformation from the film color space to the standard color space, followed by an inverted Z-S color transformation from the standard color space to the digital editing tool color space. Editing color images captured on film of type Y with a digital editing tool of type Z can be accomplished using a Y-S color transformation from the film color space to the standard color space, followed by the same inverted Z-S color transformation from the standard color space to the digital editing tool color space. To accommodate all possible device pairings in a system of n devices, only n unique transformations are required: one between each device color space and the standard color space.

SUMMARY

This specification describes technologies relating to preserving color representations during color transformation processes. In general, one aspect of the subject matter described in this specification can be embodied in a method that includes receiving a mathematical model for use in transforming color data from one color space to another color space and generating a substantially invertible approximation of the mathematical model that conforms to a defined color management system architecture. Other embodiments of this aspect include corresponding systems, apparatus, and computer program products.

These and other embodiments can optionally include one or more of the following features. The mathematical model may include a logarithm function that may be replaced with a power function in the substantially invertible approximation of the mathematical model. The color management system architecture may be defined by the International Color Consortium (ICC) and the approximate model may be embedded in an ICC profile. The power function may be encoded as a parametric curve in an A2B table. The inverse power function may be encoded as a parametric curve in a B2A table. At least one ICC profile element may be adjusted to compensate for replacing the logarithm function with a power function. The original color space may be a film device color space. The original color data may be in the Digital Picture eXchange (DPX) format. A matrix encoded in the ICC profile may be modified to produce output values between zero and one, inclusive. At least one ICC profile element may be adjusted to compensate for the modified matrix. The method may further include receiving color data and generating an ICC profile. The method may further include providing the generated ICC profile to a process for transforming color data.

Particular embodiments of the subject matter described in this specification can be implemented to realize one or more of the following advantages. Color images in one device format may be accurately represented in another device format, selectively processed, and then accurately represented in the original device format. In a motion picture editing workflow, only the pixels targeted for selective editing may be modified. Inadvertent color changes resulting from the color transformation process may be avoided. ICC profiles may be generated to provide color-accurate, selective editing in motion picture editing workflows.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Color images in one device format may be recreated in other device formats. For example, an artist may sketch a color image on paper and then the paper may be scanned using a digital color scanner. The digital representation of the color image may then be stored as a file on an optical disk, displayed on a computer monitor, and/or printed onto paper using a color printer. Ideally, the color image displayed on the computer monitor and the printed color image will be indistinguishable from each other and from the color image represented in the original artist's sketch. Because each device has its own color characteristics, a color transformation process may be required to accurately reproduce color images in one device format using a different device format. For example, in an RGB color space, the values of the red, green, and blue subpixels necessary to display a pixel having a particular shade of orange on a computer monitor may be quite different than the values necessary to print a pixel having substantially the same orange shade using a color printer.

Color images in one device format may be processed in another device format and then returned to the original device format. This may occur, for example, when a color image is digitally edited. A process workflow used to edit a color image may involve one or more mathematical color transformations to ensure that colors from the original image are accurately represented both during the modification process and after the process is complete. An example process workflow 100 for modification of a color image is shown in FIG. 1.

Figure 1:
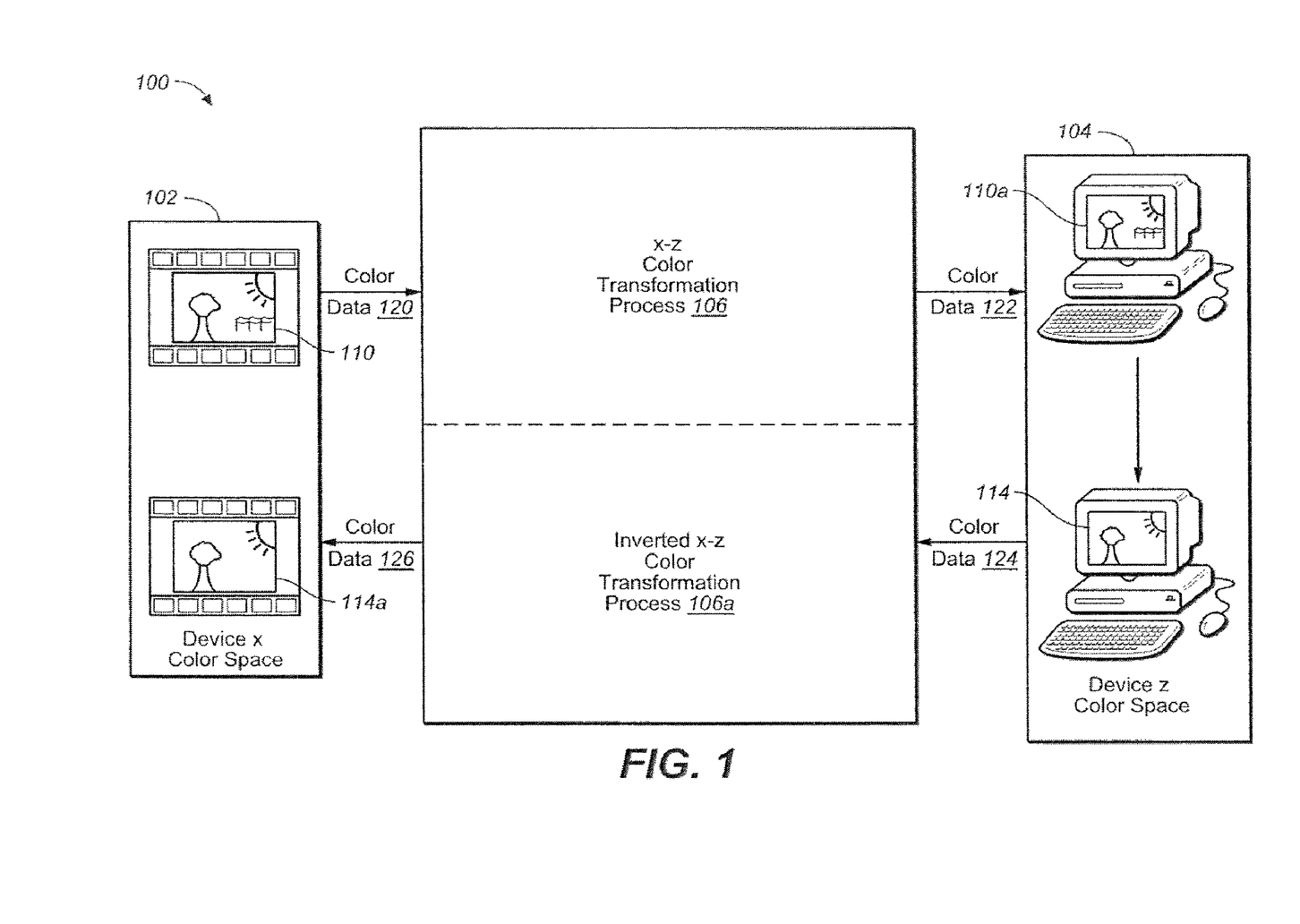
FIG. 1 illustrates an example process workflow for modification of a color image using a color transformation process.

In FIG. 1, color image 110 depicts a landscape including the sun, a tree, and power lines, and may be represented with device X. Color data 120 may describe color image 110 as represented in device X color space 102. In some implementations, device X may be color film. Film generally refers to a light sensitive device, such as celluloid covered in a light sensitive emulsion. In some implementations, color film containing color image 110 may be scanned to produce digital colorimetric data 120 representing color image 110 in device X color space 102. The format of data 120 may be the Digital Picture eXchange (DPX) format or another appropriate format. The DPX format is a common file format for digital film work and represents the printing density of each color channel (RGB) of a scanned film negative in a 10-bit log format where the gamma of the original film negative is preserved. Systems and processes for modifying color film images are described in U.S. patent application Ser. No. 11/264,879, filed Nov. 1, 2005 and entitled "MOTION PICTURE CONTENT EDITING," the entire contents of which are hereby incorporated by reference.

In some implementations, other types of devices may be used for representing, creating, storing, or capturing color image 110. For example, device X may be ink and paper, optical media, or magnetic media. In addition, color image 110 may be generated as the result of a transformation from a color space associated with yet another device (not shown), such as where one device is used to create or capture the initial image and device X is used to store color image 110, which is generated by transforming the initial image.

Color data 120 may be subjected to X-Z color transformation process 106 resulting in color data 122. Color data 122 may describe color image 110a as represented in device Z color space 104. Ideally, color image 110a is an accurate representation of color image 110. The accuracy of the mathematical model used in X-Z color transformation process 106 may determine how precisely color image 110 is represented in color image 110a. The accuracy of the mathematical model used in X-Z color transformation process 106 may depend on device X and device Z. For some device combinations, a simple mathematical model may produce a high-quality representation of color image 110 in device Z color space 104. For some device combinations, a more complex mathematical model may be required to produce a high-quality representation of color image 110 in device Z color space 104.

Color image 110a, as represented with device Z, may then be processed, for example, to remove the power lines appearing in color image 110a. In some implementations, device Z may be an editing device such as, for example, the Adobe® After Effects® computer software application. Other editing devices or software applications may also be used. A user of device Z may wish to selectively edit only those pixels associated with the power lines, leaving other pixels unchanged.

Color image 114 may be the result of a selective, color-accurate editing of color image 110a to remove the power lines and may represent the scene as if it were originally captured without the power lines. Color data 124 may describe edited color image 114 as represented in device Z color space 104. Color data 124 may be subjected to the inverted X-Z color transformation process 106a to produce color data 126. Color data 126 may describe color image 114a as represented in device X color space 102. Ideally, color image 114a is an accurate representation of color image 114. The invertibility of the mathematical model used in X-Z color transformation process 106 may determine how precisely color image 114 (i.e., original color image 110 without the power lines) is represented in color image 114a. An invertible mathematical model results in a high-quality representation of color image 114, at least because unedited pixels are not changed as a result of the X-Z color transformation followed by the inverted X-Z color transformation. In other words, unedited pixels are represented by the same color data after the round trip color transformation as before the round trip color transformation. Taken together, a combination of the accuracy and invertibility of the mathematical model used in X-Z color transformation process 106 may determine how precisely original color image 110 as modified (e.g., without the power lines), is represented in color image 114a.

When color images in a first device format are processed in a second device format and then returned to the original first device format, such as, for example, when a digitized color film image is edited and then returned to film, one or more mathematical color transformations may be required to ensure that colors from the original image are accurately represented both during the modification process and after the process is complete. More accurate mathematical models used in the color transformations may result in more accurate color representations between images in the first device format and those images in the second device format. Invertible mathematical models used in the color transformations result in more accurate color representations between the original images in the first device format and the edited images in the first device format after the round trip color transformation is complete.

The most accurate models may not necessarily be invertible models. For example, a highly accurate mathematical model used in the X-Z color transformation process 106 of process workflow 100 may result in a precise representation of color image 110 in color image 110a. Such a precise representation may allow highly accurate color editing at device 104. However, if the highly accurate mathematical model is not invertible, the benefits of the highly accurate mathematical model may be lost because color image 114a may be a poor representation of edited color image 114, at least because unedited pixels may be changed as a result of the X-Z color transformation followed by the inverted X-Z color transformation. In other words, unedited pixels may be represented by different color data after the round trip color transformation than those pixels were before the round trip color transformation. Replacing the highly accurate mathematical model with an invertible mathematical model in the X-Z color transformation process 106 may result in a precise representation of edited color image 114 in color image 114a. However, if the invertible mathematical model is not highly accurate, color image 110a may be a poor representation of original image 110, preventing highly accurate color editing at device 104.

Figure 2:
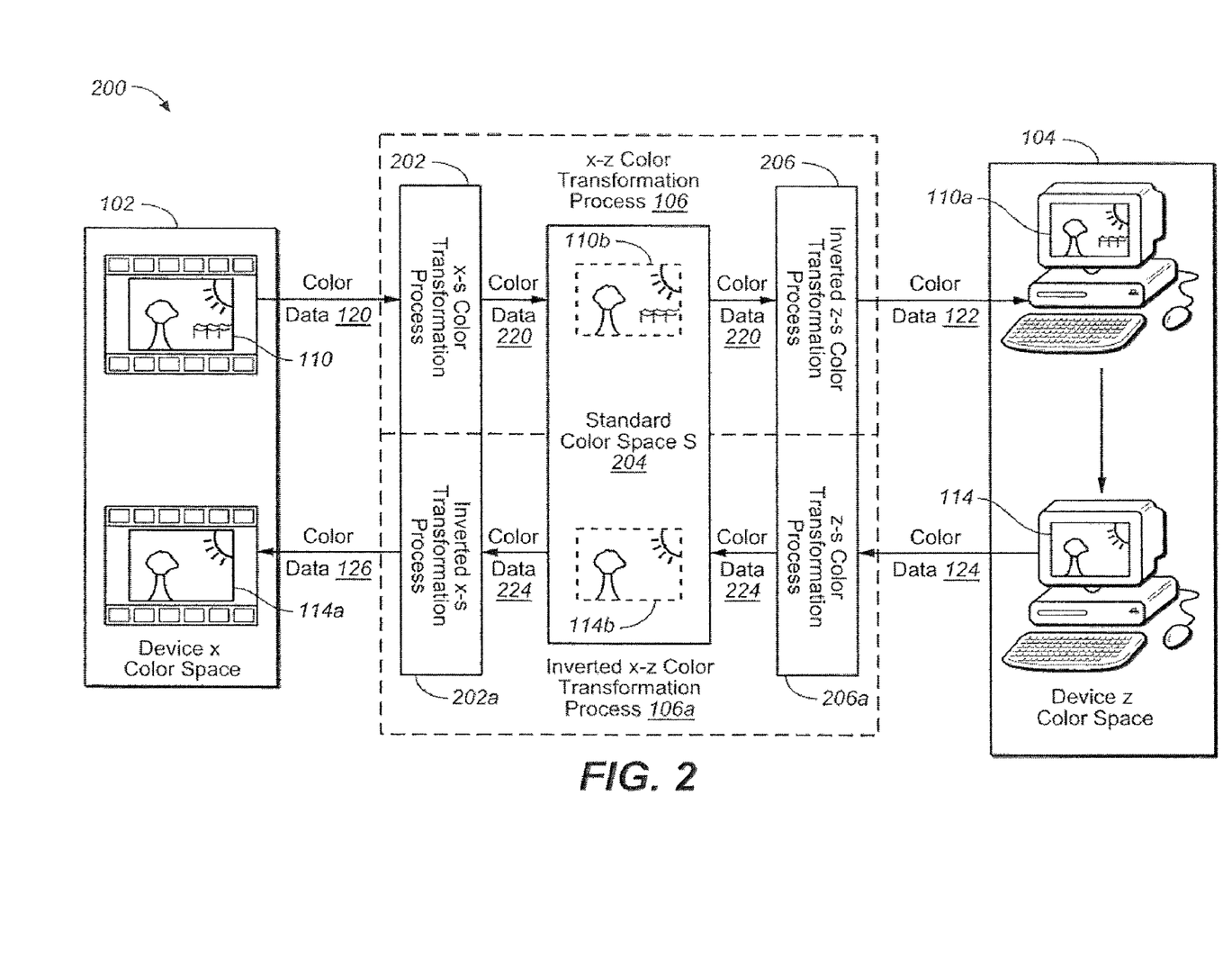
FIG. 2 illustrates an example process workflow for modification of a color image using a device-independent color transformation process.

The same accuracy versus invertibility issues are present in example process workflow 200, shown in FIG. 2, for modification of a color image. In example process 200, X-Z color transformation process 106, as described in connection with example process 100 of FIG. 1, comprises a device-independent color transformation process. As in example process 100, color image 110 may be represented with device X, color data 120 may describe color image 110 as represented in device X color space 102, color data 120 may be subjected to X-Z color transformation process 106 resulting in color data 122, color data 122 may describe color image 110*a* as represented in device Z color space 104, color image 110*a* may then be processed, for example, to remove the power lines appearing in color image 110*a*, color data 124 may describe edited color image 114 as represented in device Z color space 104, color data 124 may be subjected to the inverted X-Z color transformation process 106*a* resulting in color data 126, and color data 126 may describe color image 114*a* as represented in device X color space 102, completing the round trip color transformation.

Within X-Z color transformation process 106, color data 120, which describes color image 110 as represented in device X color space 102, may be subjected to X-S color transformation process 202 to produce color data 220. Color data 220 may describe color image 110*b* as represented in a standard color space S 204. Typically, there is no device associated with standard color space S 204, and color image 110*b* may never be physically rendered. The X-S color transformation process 202 may exist only to provide a device-independent color transformation process between device X color space 102 and standard color space S 204. Color data 220 may then be subjected to inverted Z-S color transformation process 206*a* to produce color data 122. Color data 122 may describe color image 110*a* as represented in device Z color space 104.

After processing the image with device Z 104, color data 124, which describes edited color image 114 as represented in device Z color space 104, may be subjected to Z-S color transformation process 206 to produce color data 224. Color data 224 may describe color image 114*b* as represented in standard color space S 204. Typically, there is no device associated with standard color space S 204, and color image 114*b* may never be physically rendered. The Z-S color transformation process 206 may exist only to provide a device-independent color transformation process between device Z color space 104 and standard color space S 204. Color data 224 may then be subjected to inverted X-S color transformation process 202*a* to produce color data 126. Color data 126 may describe color image 114*a* as represented in device X color space 102, completing the round trip color transformation.

The accuracy of the mathematical model used in X-S color transformation process 202 and of the mathematical model used in Z-S color transformation process 206 may determine how precisely color image 110 is represented in color image 110*a*. In addition, the invertibility of the mathematical model used in X-S color transformation process 202 and of the mathematical model used in Z-S color transformation process 206 may determine how precisely color image 114 is represented in color image 114*a*. Taken together, a combination of the accuracy and invertibility of the mathematical model used in X-S color transformation process 202 and of the mathematical model used in Z-S color transformation process 206 may determine the effectiveness of the color-accurate, selective editing attempted with device Z, and may determine how precisely original color image 110 as modified (e.g., without the power lines), is represented in color image 114*a*.

One example of a device-independent color transformation process is the process developed by the International Color Consortium (ICC). The ICC is an industry consortium established in 1993 by a group of industry vendors with the common goal of creating, promoting, and encouraging the evolution of an open, vendor-neutral, cross-platform color management system architecture. The Specification developed by the ICC specifies a cross-platform device profile format that can be used to translate color data created on one device into another device's native color space. The acceptance of this format by operating system vendors allows end users to transparently move profiles between different operating systems. The current version of the ICC Specification is ICC.1:2004-10 (Version 4.2.0.0), available at www.color.org.

The foundation of the architecture associated with the ICC Specification is the Profile Connection Space (PCS), a standard color space based on the internationally accepted International Commission on Illumination (CIE) system. The CIE system enables a set of tristimulus values, either CIEXYZ or CIELAB, to represent a unit of color, such as a pixel. The mathematical models used in the color transformation between a device color space and the PCS are embedded in ICC profiles. ICC profiles generally offer multiple mathematical models of varying complexity for color transformation between a particular device color space and the PCS, each of which is applicable to a specific rendering intent such as colorimetric rendering, perceptual rendering, and saturation rendering.

ICC profiles can be used to provide color management systems with the information necessary to transform color data between native device color spaces and the PCS. A series of base mathematical models that perform the transformation are described in the ICC profiles. Each of the base models provides different trade-offs in memory footprint, performance, and image quality. The ICC defines the format of the ICC profiles but does not define algorithms or processing details. The profile structure is defined as a header followed by a tag table followed by a series of tagged elements. The required tags provide the complete set of information necessary for a color management module (CMM) to translate color information between the PCS and the native device color space. ICC profiles provide color transformations in the form of lookup tables (LUTs), matrices, and/or parametric curves. The construction and content of the LUTs, matrices, and parametric curves in an ICC profile are vendor specific, and are not defined in the ICC specification.

An ICC profile for a device contains a forward table (A2B table) and a reverse table (B2A table). During a round-trip color transformation, the forward table of a source device ICC profile may be used to transform the color data from the source device color space to the PCS, and the reverse table of a destination device ICC profile may be used to transform the color data from the PCS to the destination device color space. After, for example, image processing at the destination device, the forward table of the destination device ICC profile may then be used to transform the color data from the destination device color space to the PCS, and the reverse table of the source device ICC profile may be used to transform the color data from the PCS back to the destination device color space, completing the round trip color transformation. For accurate round-tripping of color data from the source device color space to the destination device color space and back to the source device color space, the reverse table should be the inverse of the forward table for both the source device and destination device ICC profiles. Accurate round-tripping may ensure that unedited pixels are not changed as a result of the forward color transformation followed by the reverse color transformation. In other words, accurate round-tripping may ensure that unedited pixels are represented by the same color data after the round trip color transformation as before the round trip color transformation.

For some devices X and Z, a mathematical model may provide a color transformation between device X color space 102 and device Z color space 104, but one or more steps in the mathematical model may not be supported by the color management system architecture used in X-Z color transformation process 106. For example, X-Z color transformation process 106 may comply with an ICC device-independent color transformation process and device X may be a device for which a mathematical model has been developed between device X color space and CIEXYZ color space. If one or more of the steps in the mathematical model cannot be encoded with sufficient accuracy using the LUTs, matrices, and parametric curves supported by an ICC profile, then the mathematical model may be modified to produce an approximate mathematical model that can be encoded using the LUTs, matrices, and parametric curves supported by an ICC profile. The approximate mathematical model may be constructed such that it is invertible, i.e., the B2A table is the inverse of the A2B table, or such that it is substantially invertible, i.e., the B2A table is very nearly the inverse of the A2B table but with minor differences that have little or no effect on unedited pixels.

Figure 3:
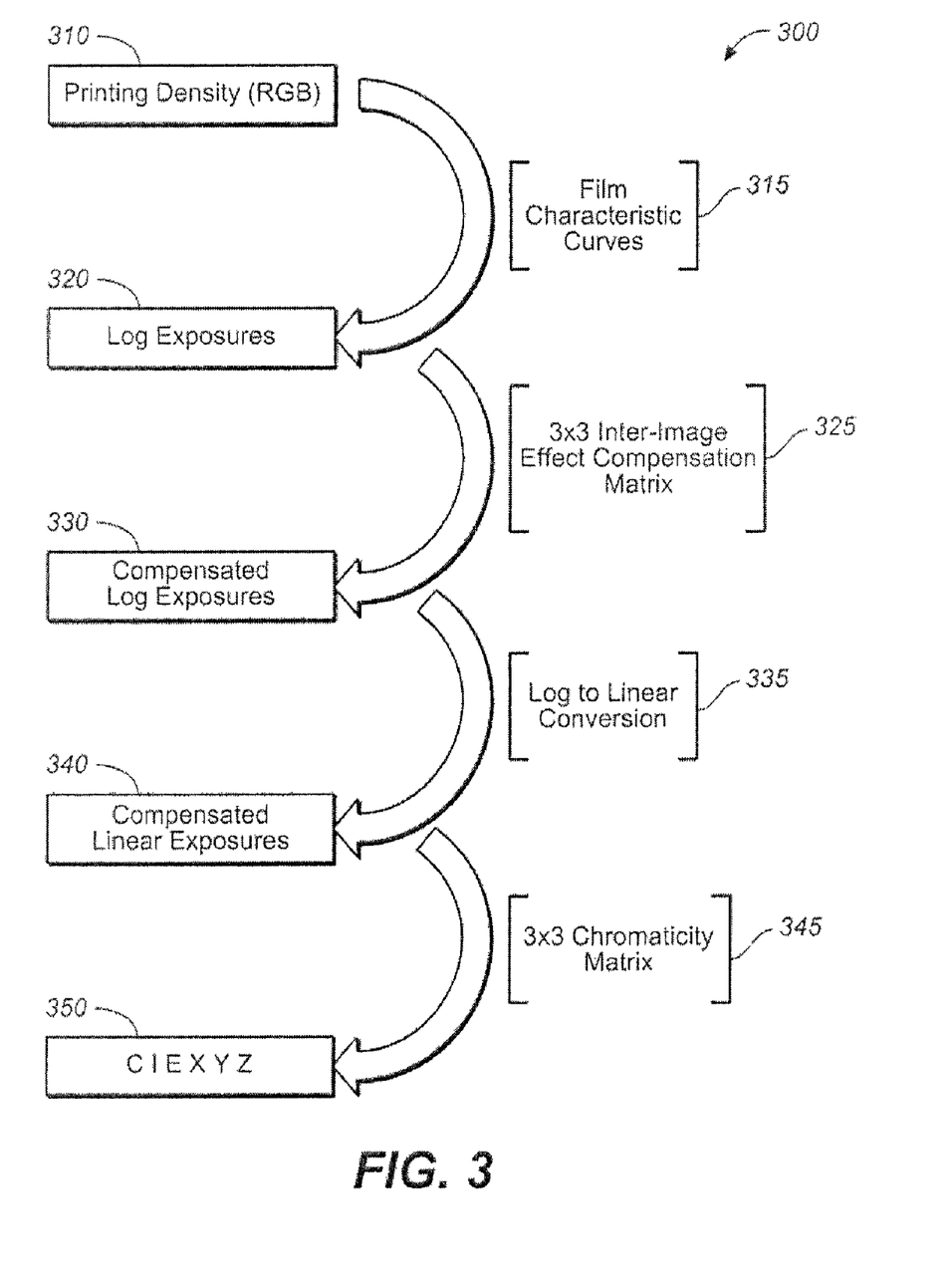
FIG. 3 illustrates an example mathematical color transformation model between a film color space and CIEXYZ color space.

FIG. 3 illustrates an example mathematical color transformation model 300 that may provide a color transformation between a film color space 310 and CIEXYZ color space 350, where one or more steps in mathematical model 300 may not be supported by an ICC color management system architecture. Mathematical model 300 may be a model developed by various entities associated with the motion picture film industry and may be published or widely known. Printing density (RGB) data 310 may be in the form of DPX files produced by a film scanner. Film characteristic curves 315 may be used to determine log exposures 320 from printing density data 310. Film characteristic curves 315 may describe the relationship between the logarithm of the exposure value (horizontal axis) and the printing density (vertical axis) of the film. Different types of film may exhibit different characteristic curves. Three curves may be plotted for color film using data derived from densitometric measurements of the three color components R, G, and B.

Mathematical model 300 may then compensate for the inter-image effect. Color film is generally composed of three dye layers: a red-light-sensitive layer, a green-light-sensitive layer, and a blue-light-sensitive layer. Ideally, when film is exposed with only one of red, green, or blue light, only the dye layer sensitive to that particular color of light should be developed. However, an occurrence known as the inter-image effect produces some development in the other two layers as well. Mathematical model 300 may compensate for this inter-image effect by multiplying log exposures 320 by a 3×3 matrix 325. The resulting compensated log exposures 330 may then undergo a log to linear conversion 335 resulting in compensated linear exposures 340. The compensated linear exposures 340 may then be multiplied by a 3×3 chromaticity matrix 345, resulting in CIEXYZ data 350.

An example structure representing an ICC color transformation from RGB color space to CIEXYZ color space may contain up to five processing elements stored in an A2B (i.e., forward) table:
set of one dimensional (1D) curves→multidimensional color lookup table (CLUT)→set of 1D curves→3×3 matrix with offset terms→set of 1D curves
The structure of the B2A (i.e., reverse) table may be:
set of 1D curves→3×3 matrix with offset terms→set of 1D curves→multidimensional CLUT→set of 1D curves
The 1D curves in an ICC profile may be 16-bit sampled curves or simple parametric curves. Values resulting from matrix processing in an ICC profile may be clipped such that the resultant values fall with the range 0.0-1.0.

Figure 4:
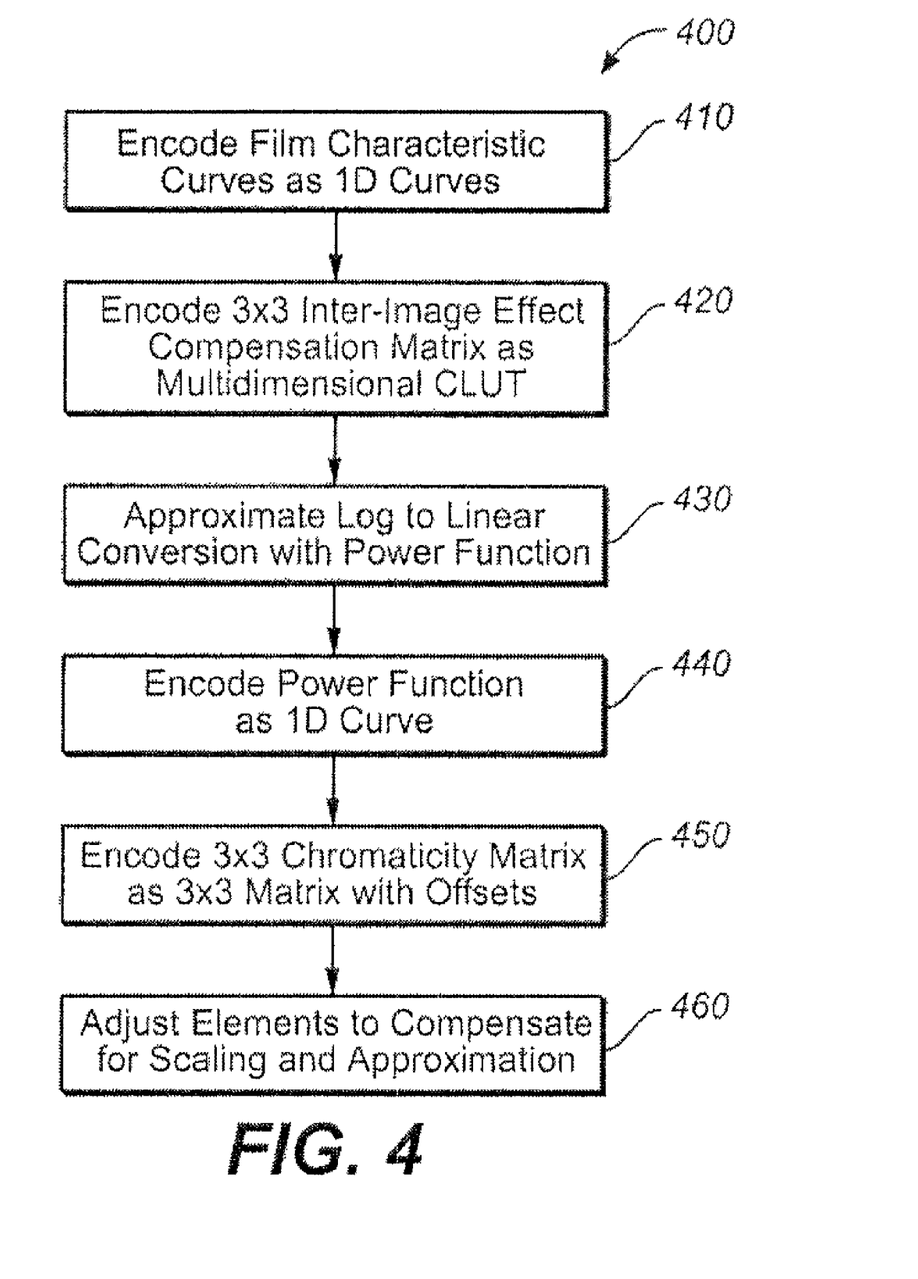
FIG. 4 illustrates an example process for encoding a mathematical model in an ICC profile.

Mathematical model 300 may be modified to produce a second mathematical model approximating mathematical model 300 that may be encoded using elements supported by a particular color management system architecture. For example, mathematical model 300 may be modified to produce a second mathematical model approximating mathematical model 300 that may be encoded using elements supported by the example ICC profile structure set forth above. A example process 400 for encoding the second mathematical model in an ICC profile is illustrated in FIG. 4. At step 410, film characteristic curves 315 may be encoded as 1D curves supported by the ICC profile structure. In some implementations, curves may require scaling in conjunction with being encoded as 1D curves supported by the ICC profile. For example, a curve with a very small initial slope may be difficult to encode. Such a curve may be divided into a first modified curve and a second modified curve with each of the first and second modified curves encoded as separate elements in the ICC profile. The first curve may represent the original curve raised to, for example, the power 0.5. Raising the original curve to a power may decrease the slope sufficiently, enabling the modified curve to be accurately encoded in the ICC profile. To compensate for raising the original curve to the power 0.5, the second curve may be simply a gamma function with exponent 2.0. Applying both the first and second modified curves to a set of data may result in an accurate approximation of applying the original curves to the set of data.

The ICC profile structure supports only one matrix element and mathematical model 300 includes two matrices. To overcome this limitation, 3×3 inter-image effect compensation matrix 325 may be encoded as a multidimensional CLUT at step 420. It is well known that a 2×2×2 three dimensional (3D) CLUT can be used to represent a 3×3 matrix, therefore the 3×3 inter-image effect compensation matrix may be encoded as a 2×2×2 3D CLUT at step 420.

The logarithm function associated with log to linear conversion 335 may be approximated with a power function at step 430, and the power function may be encoded as a 1D parametric curve at step 440. The power function may be selected such that its inverse may also be encoded as a 1D parametric curve in a reverse B2A table to ensure invertibility of the A2B table. To compensate for any loss of precision associated with approximating the logarithm function, one or more ICC profile elements may be modified in step 460 in conjunction with approximating the logarithm function with a power function.

At step 450, 3×3 chromaticity matrix 345 may be encoded as a 3×3 matrix with offsets as supported by the ICC profile structure. Because values resulting from matrix processing in an ICC profile may be clipped such that the resultant values fall with the range 0.0-1.0, matrices may be carefully chosen to avoid the occurrence of any such clipping. To ensure invertibility of the A2B table, the matrix may be scaled or offset such that processing results always fall within the range 0.0-1.0. To compensate for any loss of precision associated with scaling or offsetting the encoded matrix, one or more ICC profile elements may be modified in step 460.

Example process 400 may represent part of a process for generating an ICC profile encoding the second mathematical model. In some implementations, additional process steps may be required. For example, additional data associated with a particular device may be required to develop an ICC profile for that particular device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
receiving a first mathematical model associated with transforming first color data into second color data, the first color data associated with a color image as represented in a first color space and the second color data associated with the color image as represented in a second color space; and
generating, by operation of a computer, a second mathematical model approximating the first mathematical model, the second mathematical model conforming to a defined color management system architecture, the second mathematical model substantially invertible to enable generating an inverse of the second mathematical model that accurately reproduces color data in the first color space based on unmodified second color data after converting the first color data into the second color data to facilitate modification of a portion of the second color data, wherein the first mathematical model is associated with a logarithm function and generating the second mathematical model approximating the first mathematical model includes replacing the logarithm function with a power function approximating the logarithm function.

2. The method of claim 1, wherein the defined color management system architecture is defined by the International Color Consortium (ICC), the second mathematical model is embedded in an ICC profile, the power function is encoded as a first parametric curve in an A2B table, and an inverse power function is encoded as a second parametric curve in a B2A table.

3. The method of claim 2, wherein generating the second mathematical model approximating the first mathematical model further comprises adjusting at least one ICC profile element to compensate for replacing the logarithm function with a power function.

4. The method of claim 1, wherein the first color space comprises a film device color space.

5. The method of claim 4, wherein the defined color management system architecture is defined by the International Color Consortium (ICC) and the second mathematical model is embedded in an ICC profile.

6. The method of claim 1, wherein the defined color management system architecture is defined by the International Color Consortium (ICC).

7. The method of claim 6, wherein the second mathematical model is embedded in an ICC profile comprising a matrix element encoding a matrix, the matrix is configured to produce at least one output value when applied to at least one input value, and the matrix is modified such that the at least one output value produced falls within the range 0.0-1.0.

8. The method of claim 7, wherein at least one ICC profile element is adjusted to compensate for the modified matrix.

9. The method of claim 6, further comprising:
receiving the first color data; and
generating an ICC profile associated with the first color space.

10. The method of claim 9, further comprising:
providing the generated ICC profile to a process for transforming the first color data into the second color data.

11. A computer program product, encoded on a non-transitory computer-readable medium, operable to cause data processing apparatus to perform operations comprising:
receiving a first mathematical model associated with transforming first color data into second color data, the first color data associated with a color image as represented in a first color space and the second color data associated with the color image as represented in a second color space; and
generating a second mathematical model approximating the first mathematical model, the second mathematical model conforming to a defined color management system architecture, the second mathematical model substantially invertible to enable generating an inverse of the second mathematical model that accurately reproduces color data in the first color space based on unmodified second color data after converting the first color data into the second color data to facilitate modification of a portion of the second color data, wherein the first mathematical model is associated with a logarithm function and generating the second mathematical model approximating the first mathematical model includes replacing the logarithm function with a power function approximating the logarithm function.

12. The computer program product of claim 11, wherein the defined color management system architecture is defined by the International Color Consortium (ICC), the second mathematical model is embedded in an ICC profile, the power function is encoded as a first parametric curve in an A2B table, and an inverse power function is encoded as a second parametric curve in a B2A table.

13. The computer program product of claim 12, wherein generating the second mathematical model approximating the first mathematical model further comprises adjusting at least one ICC profile element to compensate for replacing the logarithm function with a power function.

14. The computer program product of claim 11, wherein the first color space comprises a film device color space.

15. The computer program product of claim 14, wherein the first color data is formatted according to a Digital Picture eXchange (DPX) format.

16. The computer program product of claim 11, wherein the defined color management system architecture is defined by the International Color Consortium (ICC).

17. The computer program product of claim 16, wherein the second mathematical model is embedded in an ICC profile comprising a matrix element encoding a matrix, the matrix is configured to produce at least one output value when applied to at least one input value, and the matrix is modified such that the at least one output value produced falls within the range 0.0-1.0.

18. The computer program product of claim 17, wherein at least one ICC profile element is adjusted to compensate for the modified matrix.

19. The computer program product of claim 16, the operations further comprising:
receiving the first color data; and
generating an ICC profile associated with the first color space.

20. The computer program product of claim 19, the operations further comprising:
providing the generated ICC profile to a process for transforming the first color data into the second color data.

21. A system comprising:
an input device operable to receive a first mathematical model associated with transforming first color data into second color data, the first color data associated with a color image as represented in a first color space and the second color data associated with the color image as represented in a second color space; and a processor in communication with the input device, the processor operable to generate a second mathematical model approximating the first mathematical model, the second mathematical model conforming to a defined color management system architecture, the second mathematical model substantially invertible to enable generating an inverse of the second mathematical model that accurately reproduces color data in the first color space based on unmodified second color data after converting the first color data into the second color data to facilitate modification of a portion of the second color data, wherein the first mathematical model is associated with a logarithm function and generating the second mathematical model approximating the first mathematical model includes replacing the logarithm function with a power function approximating the logarithm function.

22. The system of claim 21, wherein the defined color management system architecture is defined by the International Color Consortium (ICC).

23. The system of claim 22, wherein the second mathematical model is embedded in an ICC profile, the system further comprising:
an output device in communication with the processor, the output device operable to output the ICC profile.

24. A method comprising:
receiving a first mathematical model associated with transforming first color data into second color data, the first color data associated with a color image as represented in a first color space and the second color data associated with the color image as represented in a second color space; and
generating, by operation of a computer, a second mathematical model approximating the first mathematical model, the second mathematical model conforming to a defined color management system architecture defined by the International Color Consortium (ICC), the second mathematical model substantially invertible to enable generating an inverse of the second mathematical model that accurately reproduces color data in the first color space based on unmodified second color data after converting the first color data into the second color data to facilitate modification of a portion of the second color data, wherein the second mathematical model is embedded in an ICC profile comprising a matrix element encoding a matrix, the matrix is configured to produce at least one output value when applied to at least one input value, and the matrix is modified such that the at least one output value produced falls within the range 0.0-1.0.

25. The method of claim 24, wherein the first color space comprises a film device color space.

26. The method of claim 24, wherein at least one ICC profile element is adjusted to compensate for the modified matrix.

27. The method of claim 24, further comprising:
receiving the first color data; and
generating an ICC profile associated with the first color space.

28. The method of claim 27, further comprising:
providing the generated ICC profile to a process for transforming the first color data into the second color data.

29. A computer program product, encoded on a non-transitory computer-readable medium, operable to cause data processing apparatus to perform operations comprising:
receiving a first mathematical model associated with transforming first color data into second color data, the first color data associated with a color image as represented in a first color space and the second color data associated with the color image as represented in a second color space; and
generating a second mathematical model approximating the first mathematical model, the second mathematical model conforming to a defined color management system architecture that is defined by the International Color Consortium (ICC), the second mathematical model substantially invertible to enable generating an inverse of the second mathematical model that accurately reproduces color data in the first color space based on unmodified second color data after converting the first color data into the second color data to facilitate modification of a portion of the second color data, wherein the second mathematical model is embedded in an ICC profile comprising a matrix element encoding a matrix, the matrix is configured to produce at least one output value when applied to at least one input value, and the matrix is modified such that the at least one output value produced falls within the range 0.0-1.0.

30. The computer program product of claim 29, wherein the first color data is formatted according to a Digital Picture eXchange (DPX) format.

31. The computer program product of claim 29, wherein at least one ICC profile element is adjusted to compensate for the modified matrix.

32. The computer program product of claim 29, the operations further comprising:
receiving the first color data; and
generating an ICC profile associated with the first color space.

33. The computer program product of claim 32, the operations further comprising:
providing the generated ICC profile to a process for transforming the first color data into the second color data.

34. A system comprising:
an input device operable to receive a first mathematical model associated with transforming first color data into second color data, the first color data associated with a color image as represented in a first color space and the second color data associated with the color image as represented in a second color space; and
a processor in communication with the input device, the processor operable to generate a second mathematical model approximating the first mathematical model, the second mathematical model conforming to a defined color management system architecture that is defined by the International Color Consortium (ICC), the second mathematical model substantially invertible to enable generating an inverse of the second mathematical model that accurately reproduces color data in the first color space based on unmodified second color data after converting the first color data into the second color data to facilitate modification of a portion of the second color data, wherein the second mathematical model is embedded in an ICC profile comprising a matrix element encoding a matrix, the matrix is configured to produce at least one output value when applied to at least one input value, and the matrix is modified such that the at least one output value produced falls within the range 0.0-1.0.

35. The system of claim 34 further comprising:
an output device in communication with the processor, the output device operable to output the ICC profile.

* * * * *